(12) United States Patent
Barbier et al.

(10) Patent No.: US 9,255,515 B2
(45) Date of Patent: Feb. 9, 2016

(54) METHOD FOR DETERMINING IF AN INJECTOR IS IN A BLOCKED STATE

(71) Applicants: CONTINENTAL AUTOMOTIVE FRANCE, Toulouse (FR); CONTINENTAL AUTOMOTIVE Gmbh, Hannover (DE)

(72) Inventors: Pascal Barbier, Tournefeuille (FR); Roland Lang, Aiterhofen (DE); Ningsheng Qiao, Troy, MI (US)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/533,332

(22) Filed: Nov. 5, 2014

(65) Prior Publication Data

US 2015/0128568 A1 May 14, 2015

(30) Foreign Application Priority Data

Nov. 8, 2013 (FR) ..................................... 13 60956

(51) Int. Cl.
*G01M 15/02* (2006.01)
*F01N 11/00* (2006.01)
(Continued)

(52) U.S. Cl.
CPC .............. *F01N 11/00* (2013.01); *F01N 3/2066* (2013.01); *F01N 9/00* (2013.01); *F02D 41/221* (2013.01);
(Continued)

(58) Field of Classification Search
CPC ..... G01M 15/02; F01N 11/00; F01N 2550/05

USPC ............................. 73/114.69, 114.75, 114.77
See application file for complete search history.

(56) References Cited

U.S. PATENT DOCUMENTS 5,153,522 A 10/1992 Sano
6,647,769 B1 * 11/2003 Fujino ................... F02B 61/045
73/114.41
(Continued)

FOREIGN PATENT DOCUMENTS

DE 41 22 348 1/1992
DE 10 2008 041528 3/2010
(Continued)

OTHER PUBLICATIONS

French Search Report dated Jun. 27, 2014, corresponding to the Foreign Priority Application No. 1360956.

*Primary Examiner* — Eric S McCall
(74) *Attorney, Agent, or Firm* — Young & Thompson

(57) ABSTRACT

A method for determining if an injector (10) is in a blocked state, the injector including a coil of resistance R and of inductance L, passed through by a power supply current of maximum intensity ($I_{max}$), and powered by a voltage E, the method includes:
  controlling the opening of the injector,
  measuring the intensity I passing through a measurement resistance r as a function of time t,
  determining a necessary duration τ to reach a predetermined intensity value ($I_{pred}$), lower than the maximum intensity ($I_{max}$),
  computing the inductance L as a function of the necessary duration,
  if L≥Lth, then the injector is blocked in the closed position, otherwise
  if L<Lth, the injector is blocked in the open position, with Lth being a threshold value of the inductance.

9 Claims, 3 Drawing Sheets

(51) Int. Cl.
*F01N 3/20* (2006.01)
*F01N 9/00* (2006.01)
*F02D 41/22* (2006.01)
*F02D 41/20* (2006.01)

(52) U.S. Cl.
CPC ..... *F01N 2550/05* (2013.01); *F02D 2041/2055* (2013.01); *F02D 2041/2058* (2013.01); *F02D 2041/224* (2013.01); *F02D 2200/063* (2013.01)

(56) References Cited

U.S. PATENT DOCUMENTS

| | | | |
|---|---|---|---|
| 6,657,847 | B1 | 12/2003 | Wright et al. |
| 2010/0101544 | A1* | 4/2010 | Jung ............... F02D 41/0007 123/559.1 |
| 2012/0255282 | A1 | 10/2012 | Nagata |
| 2012/0296551 | A1 | 11/2012 | Kabasin |
| 2012/0296553 | A1 | 11/2012 | Bagnasco et al. |
| 2013/0073188 | A1* | 3/2013 | Rosel ............... F02D 41/20 701/105 |
| 2014/0095052 | A1 | 4/2014 | Frohlich et al. |
| 2015/0122000 | A1* | 5/2015 | Willimowski et al. . F02M 65/00 73/114.45 |

FOREIGN PATENT DOCUMENTS

| | | |
|---|---|---|
| DE | 10 2011 083481 | 12/2012 |
| EP | 1 069 284 | 1/2001 |
| FR | 2 961 853 | 12/2011 |
| WO | 2012/167290 | 12/2012 |

* cited by examiner

METHOD FOR DETERMINING IF AN INJECTOR IS IN A BLOCKED STATE

FIELD OF THE INVENTION

The invention relates to a method for determining if an injector is in a blocked state.

BACKGROUND OF THE INVENTION

The injector is a solenoid injector, of the urea injector type, used in an exhaust line of a motor vehicle and situated upstream of a nitrogen oxide catalyst, of SCR (Selective Catalyst Reduction) type.

The injector injects urea, more specifically an aqueous solution containing 32.5% by volume of urea, in the exhaust line. The duly injected urea is propagated to the SCR catalyst, to react with the nitrogen oxides (NOx) originating from the combustion chamber of the engine and present in the SCR catalyst. The chemical reaction produces dinitrogen and oxygen at the exhaust line outlet.

Such an SCR system is known to those skilled in the art and makes it possible to considerably reduce the amount of nitrogen oxide emitted by the engine with which the vehicle is equipped. A major drawback in implementing an SCR system lies in the correct dosage of the quantity of urea to be injected into the SCR catalyst. In practice, an excessively small quantity of urea injected does not make it possible to reduce the nitrogen oxides present in the exhaust in satisfactory proportion. The international standards regarding the maximum amount of nitrogen oxide (NOx) emissions at the exhaust outlet are then no longer observed. An excess quantity of urea injected results in odorous and irritant leaks of ammonia at the exhaust pipe outlet, which is not desirable.

Controlling the quantity of urea that is injected by the injector is therefore of prime importance. To this end, it is necessary to rapidly detect its malfunction, more particularly to detect a blocked injector. Such injector failures can occur, for example, when the aqueous solution of urea crystallizes inside the injector at high temperature (>100° C.) In fact, above 100° C., the water in the aqueous solution is evaporated, and the urea forms solid residues. It is possible to melt these residues by heating the urea above its melting point, that is to say, above 140° C.

In order to detect the malfunctioning of a urea injector, it is known practice from the prior art to position a nitrogen oxides (NOx) sensor downstream of the SCR catalyst. This sensor measures the level of nitrogen oxides present at the outlet of the SCR catalyst and makes it possible to detect a failing urea injector. However, in the case of an injector that is blocked open, a significant quantity of ammonia is first stored in the SCR catalyst until the latter saturates, and the NOx sensor does not instantaneously detect an abnormally high quantity of ammonia due to the leak from the injector. Nor, in the case of an injector that is blocked closed, does the NOx sensor fairly rapidly detect an abnormally high quantity of NOx due to the failure of the injector, because of the inertia of the chemical reaction occurring inside the SCR catalyst.

Furthermore, the detection of the malfunctioning of the urea injector by virtue of the NOx sensor does not make it possible to diagnose a failure of the injector before the SCR system is started up. In practice, it is necessary first to activate the injector several times by urea injection commands and wait for the response from the NOx sensor, situated downstream of the SCR catalyst, before being able to analyze said signal. With such a method, leaks of ammonia and excessive quantities of NOx in the exhaust during a short instant before the diagnosis is made are inevitable.

It is also known from the prior art, in order to detect a blocked solenoid injector, for example a fuel injector, to measure a voltage at the terminals of the injector. US 2012/0296553 A1 describes a control system for an internal combustion engine and a method for controlling said engine that makes it possible to distinguish a blocked fuel injector from a "normal" injector, that is to say one that is operating correctly. The distinction is made on the basis of the measurement of a voltage at the terminals of the injector. During the command to close or open the injector, if the latter is blocked, the voltage at the terminals of the injector deviates from a nominal voltage.

On the same principle, it is known practice to measure a voltage Ur (see FIG. 3a) at the terminals of a measurement resistance in order to determine whether or not the injector is blocked. FIG. 3a shows an injector 10 and a control device D for said injector 10 from the prior art. The injector is, on one side, supplied with current (generally a voltage E of 12 V) by a microcontroller 80 and, on the other side, connected to the ground. A measurement resistance r is connected on one side to the injector 10 and on the other side to the ground. The voltage Ur at the terminals of the measurement resistance r is measured by the microcontroller 80. Upon a command to open the injector 10, the voltage Ur increases asymptotically (see curve B in FIG. 1), but undergoes a temporary decrease Z when the injector 10 finally opens. When the injector 10 is blocked (curve A), this temporary decrease Z does not appear on the measurement of the voltage Ur. The presence or the absence of this temporary decrease Z consequently makes it possible to rapidly determine whether or not the injector is blocked.

These methods from the prior art present drawbacks, they do not make it possible to diagnose a failing injector before starting up the system with which it is associated (in our example, the SCR system).

It will be understood that it is necessary to rapidly detect the malfunctioning of a urea injector and do so even before the SCR system is started up. Such is the aim of the present invention.

SUMMARY OF THE INVENTION

The invention proposes a method for determining if an injector is in a blocked state, said injector comprising an electromagnetic solenoid with a coil having a resistance and an inductance, passed through by a power supply current of maximum intensity, and powered by a power supply voltage, a closure and an opening of the injector being controlled by a control device, said control device comprising a microcontroller, and a measurement resistance, the detection method according to the invention comprising the following steps:
  Step 1: Control of the opening of the injector by the microcontroller,
  Step 2: Measurement by the microcontroller of the intensity of the current passing through the measurement resistance as a function of time,
  Step 3: Determination of a necessary duration for the intensity to reach a predetermined intensity value, lower than the maximum intensity, such that:

$$I_{pred} = P \times I_{max}$$

with P being a constant between 0 and 1,
$I_{pred}$: predetermined intensity value (A),
$I_{max}$: maximum intensity (A), Step 4: Computation of the inductance of the coil of the solenoid as a function of the necessary duration,
Step 5: Comparison of the value of the inductance thus computed to a threshold value of the inductance,
Step 6: If the value of the inductance is greater than or equal to the threshold value, then the injector is blocked in the closed position, otherwise
Step 7: If the value of the inductance is less than the threshold value, the injector is blocked in the open position.

The invention is shrewd inasmuch as the value of the inductance alone makes it possible to distinguish blocking of the injector in the closed position or in the open position. The steps 3 to 7 can be performed by additional computation means, in the form of software (for example incorporated in the microcontroller), which are therefore inexpensive and not bulky, in order to rapidly determine if the injector is blocked in the open position or in the closed position. In fact, by simply measuring the intensity I passing through a measurement resistance r, the method according to the invention makes it possible to rapidly deduce the inductance L of the coil of the solenoid and consequently the position of the injector, blocked in the closed position, or blocked in the open position.

The method according to the invention makes it possible to distinguish these two cases (blocked in the open position or blocked in the closed position) and do so even before the SCR system is started up (that is to say before pressurization of the system and activation of the urea supply pump) in order to avoid any leak of ammonia or any excessive emanation of NOx into the atmosphere.

In the case of an injector blocked in the open position, it is essential not to start up the SCR system, that is to say not to start up the urea supply pump, in order to avoid any emanation of ammonia into the atmosphere. If the SCR system is already running, then it is essential to cut the urea supply, which means stopping the urea supply pump.

In the case of an injector blocked in the closed position, the urea supply pump is, on the contrary, started up in order to force, by pressure and by heating, the dissolution of the urea crystals which are blocking the injector and be able to set the SCR system into operation.

In a first embodiment of the method according to the invention, when the constant P is between x1 and x2, with x1<x2<<1 (for example x1<0.2), then step 4 consists in:
Step 4: Computation of the inductance of the coil of the solenoid by the computation means, according to:

$$L \cong \frac{E}{\left(\frac{I_{pred}}{\tau_{min}}\right)}$$

with:
L: inductance of the coil of the solenoid (H),
E: power supply voltage (V),
$I_{pred}$: predetermined intensity (A),
$\tau_{min}$: necessary duration (s).

In a second embodiment of the method according to the invention, when the constant P is between x3 and x4, with x4>x3>>0 (for example x3>0.5), then step 4 consists in:
Step 4: Computation of the inductance of the coil of the solenoid by the computation means, according to:

$$L = \tau \times (R + r)$$

with:
L: inductance of the coil of the solenoid (H),
R: resistance of the coil of the solenoid (Ω),
r: measurement resistance (Ω),
τ: necessary duration (s).

The method can further comprise a preliminary calibration step in order to determine the threshold value of the inductance.

In a preferential embodiment of the method according to the invention, the method further comprises:
before the step 1, a step of computation, by the computation means, of the value of the resistance of the coil of the solenoid, such that:

$$R = \frac{E}{I_{max}}$$

with:
E: power supply voltage (V),
$I_{max}$: maximum intensity (A),
R: resistance of the coil of the solenoid (Ω),
and a preliminary calibration step in order to determine the threshold value of the inductance as a function of the value of the resistance of the coil of the solenoid.

These additional steps make it possible to take into account the effect of the temperature of the solenoid on the value of its resistance and therefore on the computation of the inductance of the coil of the solenoid.

The invention also relates to a control device implementing the method according to the features listed above such that the microcontroller comprises computation means suitable for:
determining a necessary duration to reach a predetermined intensity value, lower than the maximum intensity,
computing the inductance of the coil of the solenoid,
comparing the value of the inductance thus computed to a threshold value of the inductance.

In the second embodiment of the invention, the microcontroller further comprises computation means suitable for computing the value of the resistance of the coil of the solenoid.

The invention also relates to any vehicle using the control device according to the features listed above.

BRIEF DESCRIPTION OF THE DRAWINGS

Other objects, features and advantages of the invention will become apparent on reading the description which follows by way of non limiting example and on examining the attached drawings in which.

DETAILED DESCRIPTION OF THE INVENTION

Figure 1:
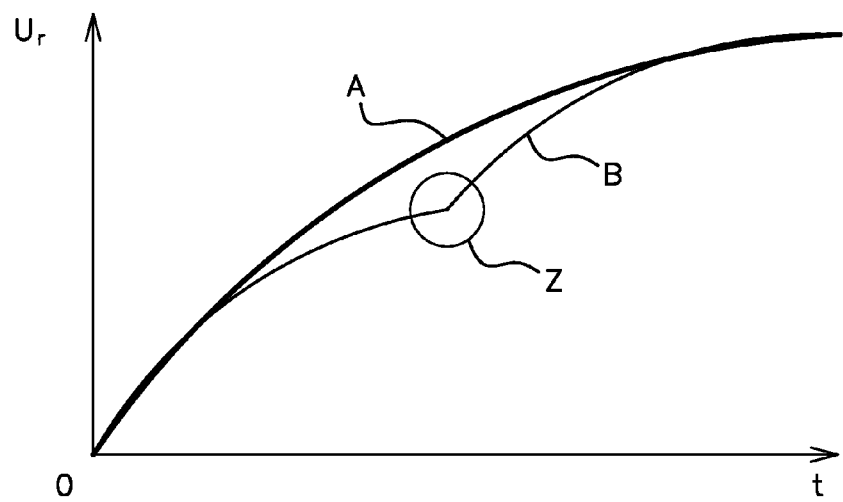
FIG. 1, explained previously, represents, according to the prior art, the trend of the voltage Ur at the terminals of the measurement resistance r, as a function of time t during a command to open an injector, for a blocked injector (curve A) and a non-blocked injector (curve B)
Figure 2:
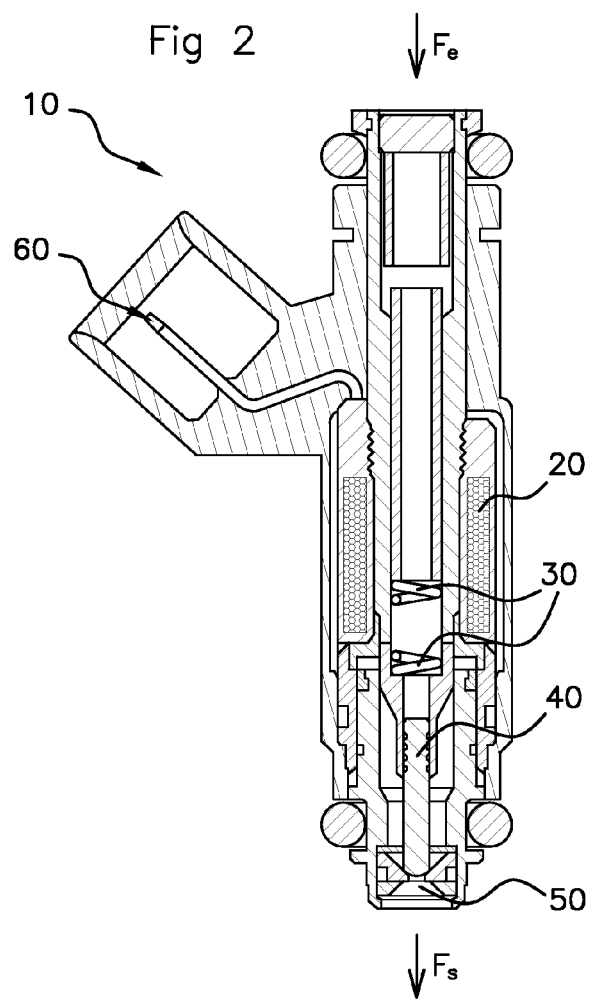
FIG. 2 represents a cross-sectional view of a solenoid injector, used, for example, to inject urea into a motor vehicle exhaust line.

A solenoid injector 10 is represented in FIG. 2. A fluid, here urea for example, passes through the injector from top (arrow Fe) to bottom (arrow Fs).

The injector 10 is supplied with current by an electrical connection 60. A ferromagnetic bar 40, also called "needle", is kept stressed by a spring 30 in a position in which it closes an orifice 50. A solenoid 20, consisting, for example, of a copper coil, surrounds the top part of the injector 10 in which the spring 30 is located. When the solenoid 20 is powered at a control voltage E (generally 12 V), the coil creates a magnetic field which attracts the ferromagnetic bar 40 toward it, the ferromagnetic bar 40 is thus displaced toward the solenoid 20, that is to say toward the top of the injector 10, compressing the spring 30. It thus frees the orifice 50, and the fluid can flow (arrow Fs) out of the injector 10.

When the control voltage is no longer applied to the solenoid 20, the spring 30 keeps the ferromagnetic bar 40 stressed against the surface of the orifice 50, the orifice 50 is thus closed and the fluid cannot exit from the injector 10.

The injector 10 is electrically linked to a control device D' (see FIG. 3b) via the electrical connection 60. The control device D' comprises, as in the prior art, a microcontroller 80 and a measurement resistance r. The injector 10 is powered at a voltage E (generally E=12 V), by the microcontroller 80. The injector 10 is also linked to the electrical ground. A measurement resistance r, of low value, is electrically linked on one side to the injector 10 and on the other to the electrical ground.

The copper coil of the solenoid 20 has an intrinsic inductance L and an intrinsic resistance R. The invention lies in observing that the inductance L of the coil is different when the injector 10 is blocked in the open position or blocked in the closed position.

The invention therefore proposes estimating the inductance L of the coil of the solenoid, based on the measurement of the intensity I passing through the measurement resistance r, in order to determine if the injector 10 is in a blocked open or blocked closed position.

Figure 3A:
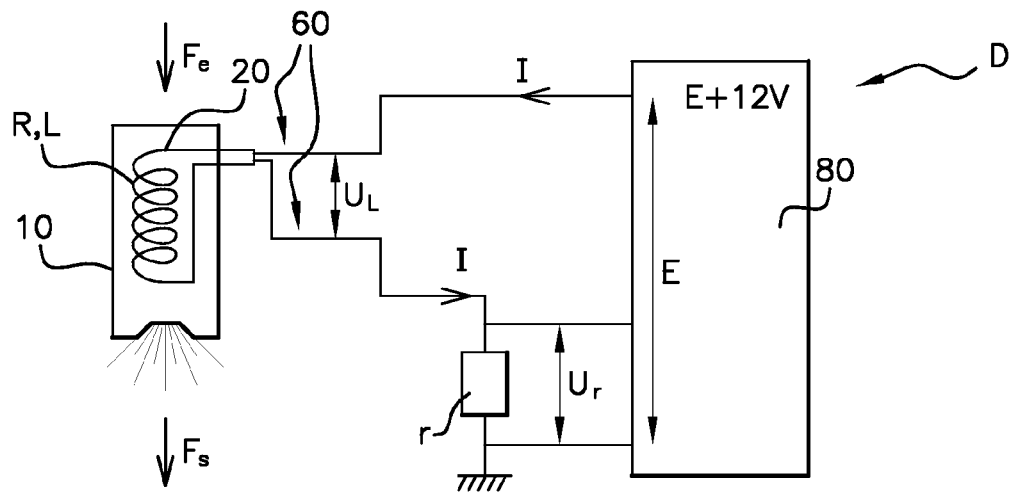
FIG. 3a represents, according to the prior art, a control device D for a solenoid injector.
Figure 3B:
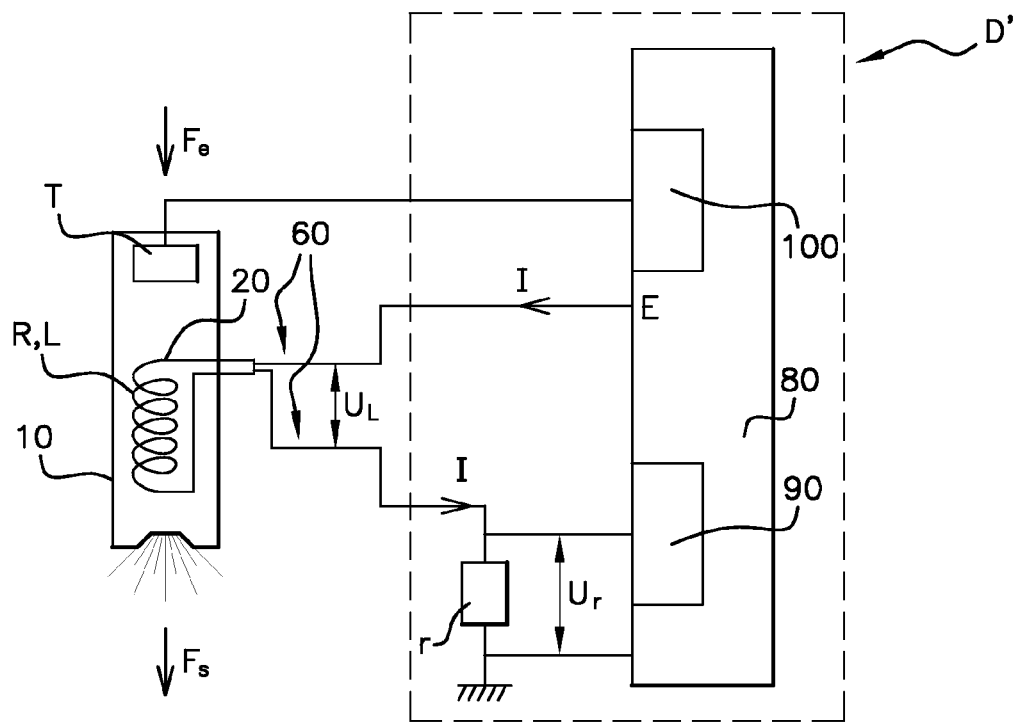
FIG. 3b represents, according to the invention, a control device D' for a solenoid injector.

For this, according to the invention, the control device D', as represented in FIG. 3, further comprises, compared to the control device D of the prior art, additional computation means 90, for example in the form of software incorporated in the microcontroller 80, in order to carry out the detection method detailed below.

Figure 4:
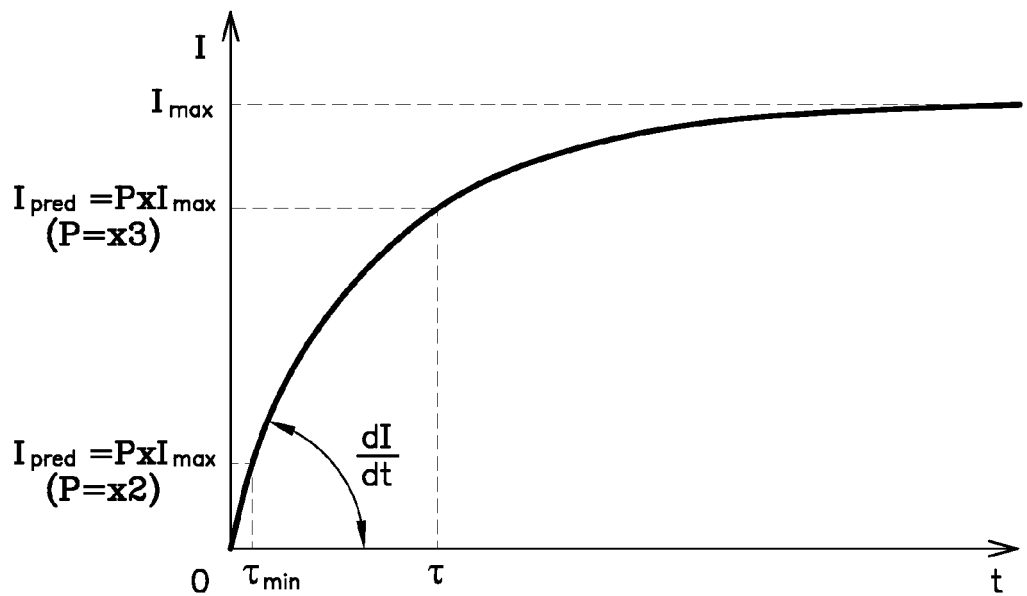
FIG. 4 represents, according to the invention, the trend of the intensity I of the current, as a function of time t, measured at the terminals of the measurement resistance r during a command to open an injector.

Upon a command to open the injector 10, originating from the microcontroller 80, the intensity I passing through the solenoid 20 is measured by said microcontroller 80 using the measurement resistance r. This intensity I follows an asymptotic curve as represented in FIG. 4.

The intensity I increases as a function of time t until it reaches a maximum intensity $I_{max}$. A time constant T is defined as being the necessary duration for the intensity I to reach a predetermined intensity value $I_{pred}$, equal to:

$$I_{pred} = P \times I_{max}$$

with P being a constant such that P∈[0,1].

The value of the intensity I is a function of the measurement resistance r, but also of the resistance R of the coil of the solenoid 20.

The power supply voltage E is equal to the sum of the voltages at the terminals of the coil $U_L$ and at the terminals of the measurement resistance $U_r$:

$$E = U_L + U_r$$

i.e.:

$$E = L \times \frac{dI}{dt} + R \times I$$

with:
E: power supply voltage of the microcontroller (V),
I: intensity of the current passing through the solenoid (A), $$\frac{dI}{dt}:$$

derivative of the intensity I with respect to time (A/s),
R: resistance of the coil of the solenoid (Ω),
L: inductance of the coil of the solenoid (H).

The intensity I is equal to:

$$I = \frac{E}{(R+r)} \times \left(1 - e^{\frac{1}{\tau}}\right) \qquad \text{equation [1]}$$

with:

$$\tau = \frac{L}{(R+r)}$$

with:
I: intensity of the current passing through the solenoid (A),
R: resistance of the coil of the solenoid (Ω),
r: measurement resistance (Ω),
τ: time constant (s),
L: inductance of the coil of the solenoid (H).

Figure 5:
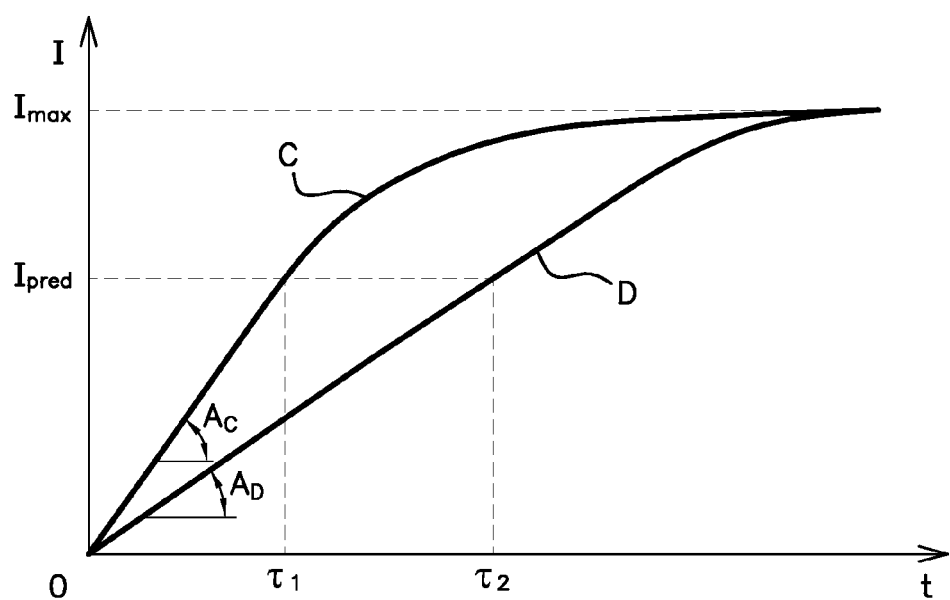
FIG. 5 represents, according to the invention, the intensity I of the current measured at the terminals of the measurement resistance, as a function of the time t, for an injector blocked in the open position (curve C) and for an injector blocked in the closed position (curve D), as well as the parameters used to detect the malfunctioning of said injector.

FIG. 5 shows, upon a command to open an injector 10, the trend curves of the intensity I passing through the injector 10 in two cases:
Curve C: the injector 10 is blocked in the open position,
Curve D: the injector 10 is blocked in the closed position.

The slope $A_D$ (injector blocked in the closed position) of the trend of the intensity I as a function of time $$\left(\frac{dI}{dt}\right)$$

of the curve D is of lower value than the slope $A_C$ of the trend of the intensity I as a function of time $$\left(\frac{dI}{dt}\right)$$

of the curve C (injector blocked in the open position).

When the injector 10 is in the open blocked position (curve C), a first time constant $\tau_1$ is defined as the duration necessary for the intensity I to reach the predetermined intensity value $I_{pred}$.

When the injector 10 is in the closed blocked position (curve D), a second time constant $\tau_2$ is defined as the duration necessary for the intensity I to reach the predetermined intensity value $I_{pred}$.

In FIG. 5:

$$\tau_2 > \tau_1$$

It is then possible to compute a first inductance $L_1$ of the coil of the solenoid of the injector 10 blocked in the open position (curve C), such that, according to equation [1]:

$$L_1 = \tau_1 \times (R+r)$$

Similarly, it is possible to compute the second inductance $L_2$ of the coil of the solenoid of the injector 10 blocked in the closed position (curve D), such that, according to equation [1]:

$$L_2 = \tau_2 \times (R+r)$$

Since $$\tau_2 > \tau_1$$

the following is obtained:

$$L_2 > L_1$$

The position of the ferromagnetic bar 40 relative to the coil of the solenoid 20 modifies the intensity of the magnetic field created by said coil. When the ferromagnetic bar 40 is in contact with the orifice 50 (injector in the closed blocked position), the inductance L of the coil is maximum. When the ferromagnetic bar 40 approaches the coil, the inductance L decreases.

Since $L_2$ corresponds to the inductance of the coil when the injector 10 is blocked in the closed position, it is possible to define an inductance threshold value, for example, Lth=$L_2$, below which the value of the inductance L then corresponds to an injector 10 blocked in the open position.

Shrewdly, when the time constant $\tau$ is small (cf. $\tau_{min}$ in FIG. 4), the value of the intensity I can be disregarded relative to the value of the slope of the trend of the intensity I as a function of time, that is to say that I is negligible relative to the derivative of the intensity with respect to the time:

$$\frac{dI}{dt}.$$

The following is then obtained:

$$E \cong L \times \frac{dI}{dt}$$

and:

$$L \cong \frac{E}{\left(\frac{dI}{dt}\right)}$$

with:
E: power supply voltage of the microcontroller (V),
L: inductance of the coil of the solenoid (H), $$\frac{dI}{dt}:$$

drift of the intensity of the current relative to the time (A/s) between I=0 and I=$I_{pred}$, that is to say between t=0 and t=$\tau_{min}$.

The invention therefore proposes two embodiments, the inductance L is computed in two different ways as a function of the value of the time constant $\tau$, $\tau_{min}$ that is to say according to the predetermined value of the intensity $I_{pred}$ and therefore of the constant P.

In a first embodiment, when the predetermined value of the intensity $I_{pred}$ is small, that is to say, when the constant P is small, for example, P<<1, between x1=0.05 and x2=0.2, then the inductance L is computed according to:

$$L \cong \frac{E}{\left(\frac{dI}{dt}\right)} \cong \frac{E}{\left(\frac{I_{pred}}{\tau_{min}}\right)}$$

E: power supply voltage of the microcontroller (V),
L: inductance of the coil of the solenoid (H), $$\frac{dI}{dt}:$$

drift of the intensity of the current relative to the time (A/s) between I=0 and I=$I_{pred}$, that is to say between t=0 and t=$\tau_{min}$.

In a second embodiment of the invention, when the predetermined value of the intensity $I_{pred}$ is large, that is to say when the constant P is large, for example, P>>0, between x3=0.5 and x4=0.9, then the inductance L is computed according to:

$$L = \tau \times (R+r)$$

with:
R: resistance of the coil of the solenoid (Ω),
r: measurement resistance (Ω),
$\tau$: time constant (s),
L: inductance of the coil of the solenoid (H).

Thus, in a first step (1) of the method according to the invention, the opening of the injector 10 is controlled using the microcontroller 80. In a second step (step 2), the intensity I of the current passing through the measurement resistance r as a function of the time t is measured by the microcontroller 80. In a third step (step 3), the computation means 90 determine a necessary duration $\tau$, $\tau_{min}$ corresponding to a predetermined intensity value $I_{pred}$ (lower than the maximum intensity $I_{max}$). The computation means 90 are, for example, software means incorporated in the microcontroller 80. Next, the inductance L of the coil of the solenoid is computed by said computation means 90 as a function of the necessary duration $\tau$, $\tau_{min}$.

Thereafter the computation means 90 then compare the value of the inductance L thus computed to a threshold value of the inductance Lth (step 5). This threshold value of the inductance Lth can have been determined previously in a calibration step and stored in the controller 80. If the value of the inductance L is greater than or equal to said threshold value Lth, then this means that the injector 10 is blocked in the closed position (step 6). If the value of the inductance L is lower than said threshold value of the inductance Lth, then this means that the injector 10 is blocked in the open position (step 7).

Thus, if the value of the inductance of the coil L is such that:

$$L < Lth$$

then the injector 10 is blocked in the open position, and if:

$$L \geq Lth$$

then the injector 10 is blocked in the closed position.

In a first embodiment, if the constant P is small, P<<1 lying between two values (x1, x2), then the inductance L is computed by the computation means 90, according to (step 4):

$$L = \frac{E}{\left(\frac{dI}{dt}\right)}$$

In a second embodiment, if the constant P is large, P>>0, lying between two other values (x3, x4), then the inductance L is computed by the computation means 90, according to (step 4):

$$L = \tau \times (R+r)$$

As mentioned above, the determination of the inductance threshold value Lth is for example carried out in a preliminary calibration step, during which the value of the inductance $L_2$ corresponding to an injector 10 blocked in the closed position is measured on a number of injectors 10. It is also possible to envisage determining a threshold inductance value Lth for each injector 10, the threshold value of the inductance Lth then being stored in each microcontroller 80 paired with each injector 10 in order to be compared to the inductance L measured for said injector 10.

After having first equipped the microcontroller 80 with computation means 90, the method according to the invention therefore comprises the following steps:

Step 1: Control of the opening of the injector 10 by the microcontroller 80, Step 2: Measurement by the microcontroller 80 of the intensity I of the current passing through the measurement resistance r as a function of time, Step 3: Determination by computation means 90 of a necessary duration $\tau$, $\tau_{min}$ for the intensity I to reach a predetermined intensity value $I_{pred}$, lower than the maximum intensity $I_{max}$, such that:

$$I_{pred} = P \times I_{max}$$

with P being a constant between 0 and 1,

Step 4: Computation of the inductance L of the coil of the solenoid 20 by computation means 90 as a function of the necessary duration $\tau$, $\tau_{min}$, Step 5: Comparison by computation means 90 of the value of the inductance L thus computed to a prestored threshold value of the inductance Lth, Step 6: If the value of the inductance L is greater than or equal to the threshold inductance value Lth, then the injector 10 is blocked in the closed position, otherwise Step 7: If the value of the inductance L is less than the threshold inductance value Lth, the injector 10 is blocked in the open position.

If the constant P is between x1 and x2, then step 4 consists in:

Step 4: Computation of the inductance L of the coil of the solenoid 20 by the computation means 90, according to:

$$L \cong \frac{E}{\left(\frac{I_{pred}}{\tau_{min}}\right)}$$

with:
E: power supply voltage of the microcontroller in volts (V),
$I_{pred}$: predetermined intensity value (A),
$\tau_{min}$: necessary duration (s).
For example, x1=0.05, x2=0.2.

If the constant P is between x3 and x4, then step 4 consists in:

Step 4: Computation of the inductance L of the coil of the solenoid 20 by the computation means 90, according to:

$$L = \tau \times (R+r)$$

with:
L: inductance of the coil of the solenoid (H),
R: resistance of the coil of the solenoid ($\Omega$),
r: measurement resistance ($\Omega$),
$\tau$: necessary duration or time constant (s).
For example x3=0.5 and x4=0.9.

However, the temperature of the solenoid 20 affects the value of the resistance R of the coil of the solenoid 20.

And since, according to the equation below, the intensity I varies as a function of the value of the resistance R of the coil of the solenoid 20:

$$I = \frac{E}{(R+r)} \times (1 - e^{\frac{1}{\tau}})$$

The value of the intensity I as a function of the time t measured by the microcontroller 80 varies also as a function of the temperature of the solenoid 20. The result thereof is that the value of the inductance L computed for the intensity value I depends on the temperature of the solenoid.

Therefore, the invention proposes, in a second embodiment, first evaluating the value of the resistance R of the coil of the solenoid before computing the inductance L.

The computation of the value of the resistance R of the coil is carried out by the computation means 90 when the intensity I measured by the microcontroller 80 has reached its maximum value $I_{max}$.

In this case, $$E = L \times \frac{dI}{dt} + R \times I \text{ with } \frac{dI}{dt} = 0,$$

when $I = I_{max}$
the following is obtained:

$$R = \frac{E}{I_{max}}$$

with:

$$E = U_L + U_r$$

And in which E is the power supply voltage (V) from the microcontroller and generally in the region of 12 V.

The method in this second embodiment therefore comprises, before the step 1, a step of computation, by the computation means 90, of the value of the resistance R of the coil such that:

$$R = \frac{E}{I_{max}}$$

The following steps 1 to 7 are identical to the first embodiment.

However, the threshold value of the inductance Lth, used in the comparison in the step 5, is determined previously as a function of the value of the resistance R of the coil. Thus the comparison between the computed value of the inductance L and the threshold inductance value Lth is performed for a same value of the resistance R of the coil.

The method according to the invention is shrewd inasmuch as it requires only additional computation means 90, in the form of software, which are therefore inexpensive and not bulky in order to rapidly determine if the injector (10) is blocked in the open position or in the closed position.

The invention therefore makes it possible, upon a single command for opening the injector, without setting the SCR system into operation (no need to pressurize the system, no activation of the urea supply pump), and by simply measuring the intensity I passing through a measurement resistance r, to rapidly deduce therefrom the inductance L of the coil of the solenoid 20 and consequently the position of the injector 10, blocked in the closed position, or blocked in the open position.

Thus, the appropriate actions can immediately be implemented on the vehicle, stopping the urea supply pump (injector blocked open) or, on the contrary, actuating said pump (injector blocked closed).

The invention claimed is:

1. A method for determining if an injector (10) is blocked, said injector (10) comprising an electromagnetic solenoid (20) with a coil having a resistance (R) and an inductance (L), passed through by a power supply current of maximum intensity ($I_{max}$) and powered by a power supply voltage (E), a closure and an opening of the injector (10) being controlled by a control device (D'), said control device (D') comprising a microcontroller (80), and a measurement resistance (r), said method comprising the following steps:
   Step 1: Controlling the opening of the injector (10) by the microcontroller (80),
   Step 2: Measuring by the microcontroller (80) the intensity (I) of the current passing through the measurement resistance (r) as a function of time (t),
   Step 3: Determining a necessary duration ($\tau$, $\tau_{min}$) for the intensity (I) to reach a predetermined intensity value ($I_{pred}$), lower than the maximum intensity ($I_{max}$), such that:

$$I_{pred} = P \times I_{max}$$

with P being a constant between 0 and 1,
   $I_{pred}$ predetermined intensity value (A),
   $I_{max}$: maximum intensity (A),
   Step 4: Computing the inductance (L) of the coil of the solenoid (20) as a function of said necessary duration ($\tau$, $\tau_{min}$),
   Step 5: Comparing the value of the inductance (L) thus computed to a threshold value of the inductance (Lth),
   Step 6: If the value of the inductance (L) is greater than or equal to the threshold value (Lth), then blocking the injector (10) in the closed position,
   Step 7: If the value of the inductance (L) is less than the threshold value (Lth), blocking the injector (10) in the open position.

2. The method as claimed in claim 1, wherein the method further comprises a preliminary calibration step in order to determine the threshold value of the inductance (Lth).

3. The method as claimed in claim 1, wherein, when the constant P is between x1 and x2, with x1<x2<<1 then step 4 consists in:
   Step 4: Computing of the inductance (L) of the coil of the solenoid (20) according to:

$$L \cong \frac{E}{\left(\frac{I_{pred}}{\tau_{min}}\right)}$$

with:
   E: power supply voltage (V),
   $I_{pred}$: predetermined intensity (A),
   $\tau_{min}$: necessary duration (s).

4. The method as claimed in claim 3, wherein, when the constant P is between x3 and x4 with x4>x3>>0, then step 4 consists in:
   Step 4: Computing the inductance (L) of the solenoid (20) according to:

$$L = \tau \times (R+r)$$

with:
   L: inductance of the coil of the solenoid (H),
   R: resistance of the coil of the solenoid ($\Omega$),
   r: measurement resistance ($\Omega$),
   $\tau$: necessary duration (s).

5. The method as claimed in claim 1, wherein said method further comprises:
   before the step 1, a step of computing the value of the resistance (R) and the coil of the solenoid, such that:

$$R = \frac{E}{I_{max}}$$

with:
   E: power supply voltage (V),
   $I_{max}$: maximum intensity (A),
   R: resistance of the coil of the solenoid ($\Omega$),
   a preliminary calibration step in order to determine the threshold value of the inductance (Lth) as a function of the value of the resistance of the coil (R) of the solenoid.

6. A control device (D') implementing the method as claimed in claim 5, which comprises a microcontroller (80) comprising computation means (90) suitable for:
   computing the value of the resistance (R) of the coil of the solenoid,
   determining a necessary duration ($\tau$, $\tau_{min}$) to reach a predetermined intensity value ($I_{pred}$), lower than the maximum intensity ($I_{max}$),
   computing the inductance (L) of the solenoid coil (20),
   comparing the value of the inductance (L) thus computed to the value of the resistance (R) of the coil of the solenoid to a threshold value of the inductance (Lth) predetermined for the same value of the resistance (R) of the coil.

7. A control device (D') implementing the method as claimed in claim 1, which comprises a microcontroller (80) comprising computation means (90) suitable for:
   determining a necessary duration ($\tau$, $\tau_{min}$) to reach a predetermined intensity value ($I_{pred}$), lower than the maximum intensity ($I_{max}$),
   computing the inductance (L) of the coil of the solenoid (20),
   comparing the value of the inductance (L) thus computed to a threshold value of the inductance (Lth).

8. A vehicle using the control device (D') as claimed in claim 7.

9. A vehicle using the control device (D') as claimed in claim 6.

* * * * *